United States Patent
Chen et al.

(10) Patent No.: US 9,177,601 B1
(45) Date of Patent: Nov. 3, 2015

(54) MULTIPLE CLEANING PROCESSES IN A SINGLE TANK

(71) Applicant: WD Media, LLC, San Jose, CA (US)

(72) Inventors: Chaoyuan C. Chen, San Jose, CA (US); Shaun H. Chen, Cupertino, CA (US); Michael S. Rosano, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 219 days.

(21) Appl. No.: 14/042,278

(22) Filed: Sep. 30, 2013

Related U.S. Application Data

(62) Division of application No. 12/363,676, filed on Jan. 30, 2009, now Pat. No. 8,562,748.

(51) Int. Cl.
- G11B 23/50 (2006.01)
- B08B 3/00 (2006.01)
- B08B 3/04 (2006.01)
- B08B 3/02 (2006.01)

(52) U.S. Cl.
CPC ............... *G11B 23/505* (2013.01); *B08B 3/00* (2013.01); *B08B 3/022* (2013.01); *B08B 3/041* (2013.01)

(58) Field of Classification Search
CPC ............ B08B 3/00; B08B 3/022; B08B 3/041
See application file for complete search history.

(56) References Cited

U.S. PATENT DOCUMENTS

| | | | |
|---|---|---|---|
| 4,643,774 A * | 2/1987 | Kishida et al. | 134/1 |
| 4,736,760 A | 4/1988 | Coberly et al. | |
| 4,902,350 A | 2/1990 | Steck | |
| 4,984,597 A | 1/1991 | McConnell et al. | |
| 5,071,776 A | 12/1991 | Matsushita et al. | |
| 5,090,432 A | 2/1992 | Bran | |
| 5,169,408 A | 12/1992 | Biggerstaff et al. | |
| 5,301,701 A | 4/1994 | Nafziger | |
| 5,317,778 A | 6/1994 | Kudo et al. | |
| 5,593,505 A | 1/1997 | Erk et al. | |
| 5,725,753 A | 3/1998 | Harada et al. | |
| 5,727,578 A | 3/1998 | Matthews | |
| 5,776,259 A | 7/1998 | Ciari | |
| 5,849,104 A | 12/1998 | Mohindra et al. | |
| 5,873,947 A | 2/1999 | Mohindra et al. | |
| 5,881,748 A | 3/1999 | Suzuki | |
| 5,911,837 A | 6/1999 | Matthews | |
| 5,950,643 A | 9/1999 | Miyazaki et al. | |
| 6,108,928 A | 8/2000 | Park et al. | |
| 6,254,688 B1 * | 7/2001 | Kobayashi et al. | 134/1 |
| 6,477,786 B1 | 11/2002 | Jones et al. | |
| 6,575,177 B1 | 6/2003 | Brown et al. | |
| 6,620,260 B2 | 9/2003 | Kumagai et al. | |
| 6,625,901 B1 | 9/2003 | Mehmandoust et al. | |
| 8,163,093 B1 | 4/2012 | Chen et al. | |
| 8,562,748 B1 | 10/2013 | Chen et al. | |
| 2001/0013355 A1 | 8/2001 | Busnaina | |
| 2002/0139390 A1 | 10/2002 | Okano et al. | |
| 2003/0234029 A1 | 12/2003 | Bergman | |
| 2007/0175496 A1 | 8/2007 | Rattray | |
| 2007/0181159 A1 | 8/2007 | Ibe et al. | |
| 2008/0295860 A1 | 12/2008 | Burger | |
| 2009/0165824 A1 | 7/2009 | Sekiguchi et al. | |

FOREIGN PATENT DOCUMENTS

| WO | 2008056969 | 5/2008 |
|---|---|---|

OTHER PUBLICATIONS

Notice of Allowance dated Dec. 16, 2011 in U.S. Appl. No. 12/369,701 11 pages.
Notice of Allowance dated Jun. 17, 2013 in U.S. Appl. No. 12/363,676 8 pages.
Office Action dated Aug. 12, 2011 in U.S. Appl. No. 12/363,676 13 pages.
Office Action dated Aug. 12, 2011 in U.S. Appl. No. 12/369,701 12 pages.
Office Action dated Dec. 14, 2011 in U.S. Appl. No. 12/363,676 19 pages.
Office Action dated Feb. 17, 2011 in U.S. Appl. No. 12/369,701 13 pages.
Advisory Action dated Feb. 21, 2012 in U.S. Appl. No. 12/363,676 4 pages.
Office Action dated Mar. 3, 2011 in U.S. Appl. No. 12/363,676 15 pages.
Advisory Action dated Oct. 18, 2011 in U.S. Appl. No. 12/369,701 2 pages.
Office Action dated Jun. 14, 2012 in U.S. Appl. No. 12/363,676 13 pages.
Office Action dated Nov. 19, 2012 in U.S. Appl. No. 12/363,676 16 pages.
Advisory Action dated Jan. 29, 2013 in U.S. Appl. No. 12/363,676 3 pages.

* cited by examiner

*Primary Examiner* — Saeed T Chaudhry

(57) ABSTRACT

Methods of cleaning workpieces are described. One method includes performing both a sonication cleaning operation and a rinse cleaning operation within a single cleaning tank. Another cleaning method described includes the use of cross flow of cleaning liquid within a cleaning tank while performing a rinse clean. The cleaning method includes the oscillation of one or more workpieces in the cleaning tank to perform the rinse clean.

9 Claims, 4 Drawing Sheets

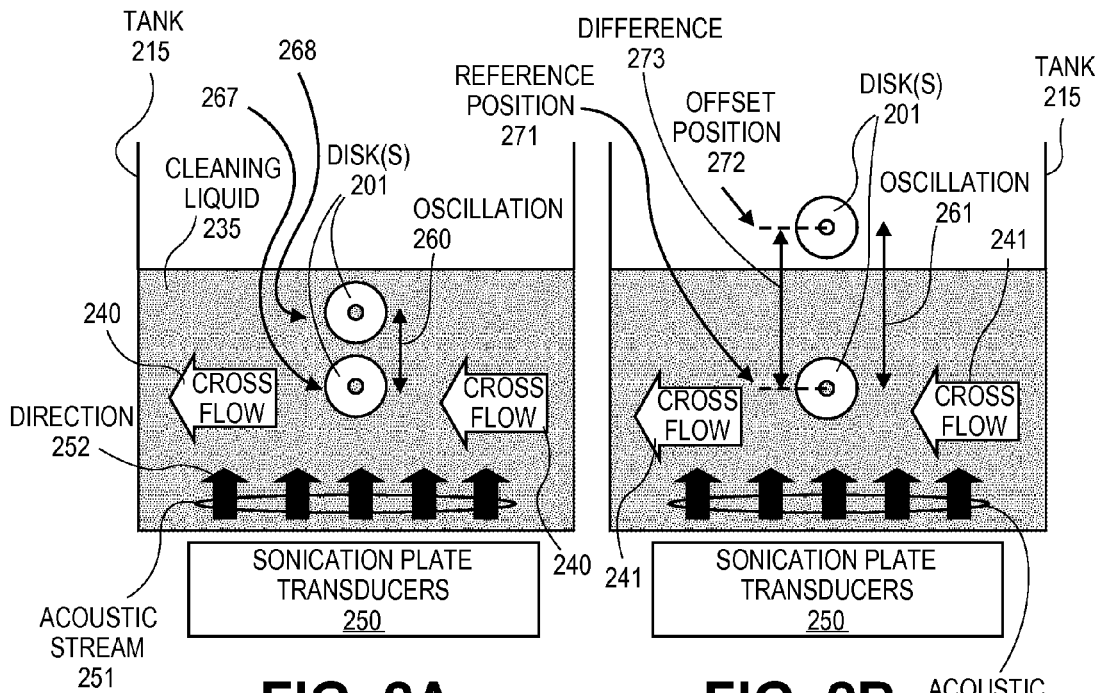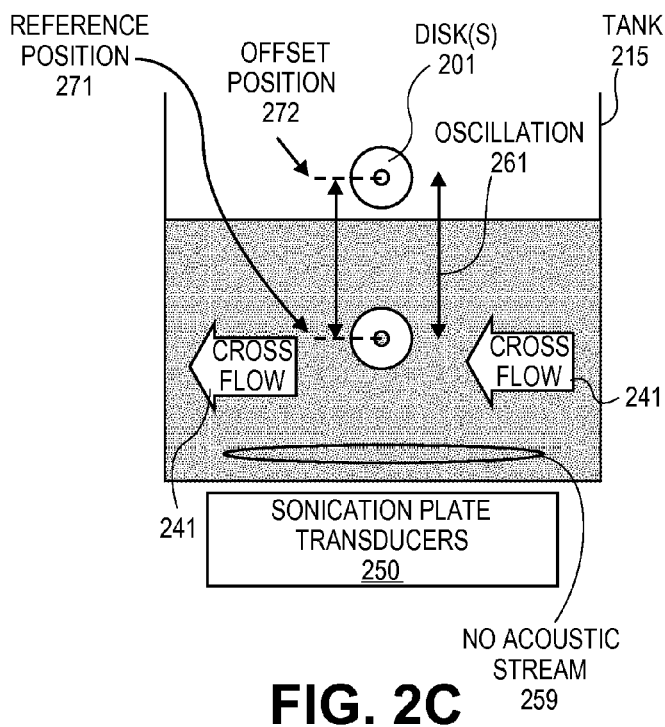

MULTIPLE CLEANING PROCESSES IN A SINGLE TANK

REFERENCE TO RELATED APPLICATIONS

This application is a divisional of U.S. patent application Ser. No. 12/363,676, filed on Jan. 30, 2009, and entitled "MULTIPLE CLEANING PROCESSES IN A SINGLE TANK", the entire content of which is incorporated herein by reference.

TECHNICAL FIELD

Embodiments described herein relate to the field of cleaning processes, more particularly, to cleaning processes for workpieces.

BACKGROUND

During a series of magnetic recording disk manufacturing operations, a disk's surface is exposed to various types of contaminants. Any material present in a manufacturing operation is a potential source of contamination. For example, sources of contamination may include process gases, chemicals, deposition materials, and liquids. The various contaminants may be deposited on the disk's surface in particulate form. If the particulate contamination is not removed, it may interfere with the proper fabrication of a magnetic recording disk. Therefore, it is necessary to clean contamination from the surface of the disk at one or more stages in the manufacturing process, such as post sputtering.

Contamination may be removed using sonication and rinsing techniques. Conventionally, a disk is submerged in a sonication tank to remove a majority of the particles from the disk's surface and then moved to another, rinse, tank to further remove lose particles in water that is cleaner than that in the sonication tank. Such sonication cleaning and rinse cleaning operations have conventionally been performed in separate cleaning tanks.

BRIEF DESCRIPTION OF THE DRAWINGS

Embodiments are illustrated by way of example, and not limitation, in the figures of the accompanying drawings in which:

FIGS. 2A and 2B illustrate the sonication and rinse operations that are performed in a common cleaning tank, according to one embodiment of the present invention.

FIG. 2C illustrates another embodiment of the present invention in which power to sonication plate transducers may be turned off during the rinse cleaning of disk(s).

DETAILED DESCRIPTION

Figure 1A:
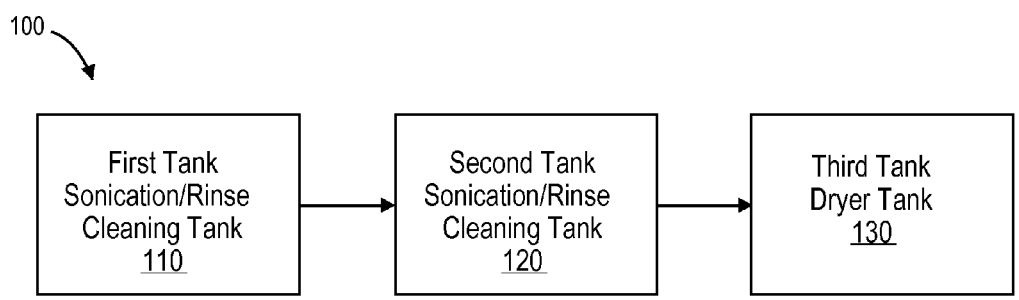
FIG. 1A illustrates a cleaning system that may utilize one or more cleaning tanks, according to embodiments of the present invention, in which both sonication cleaning and rinse cleaning of the disks are performed in a same cleaning tank.

Embodiments of the apparatus and methods are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known manufacturing processes and equipment have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Methods of cleaning one or more workpieces are described. A method according to one embodiment of the present invention includes performing two different cleaning operations within a single cleaning tank. In another embodiment described herein, a cleaning method includes the use of cross flow of cleaning liquid while performing a rinse cleaning operation in a cleaning tank. Yet another method embodiment described herein includes the oscillation of one or more workpieces in a cleaning tank to perform a rinsing operation.

Embodiments of cleaning methods are described with respect to magnetic recording disks. It should be appreciated that the embodiments of cleaning methods described herein may be applied to disks that vary in size or shape, for the production of different size disks. Embodiments of cleaning methods described herein may also be used for the cleaning of semiconductor wafers or other types of workpieces. The term "workpiece" as used herein may include, substrates, semiconductor wafers, photomasks, magnetic recording disks, optical discs, glass substrates, flat panel display surfaces, liquid crystal display surfaces, etc.

Embodiments of cleaning methods are also described with respect to sonication. The sonication energy applied to a cleaning tank liquid as described by the methods herein may be applied by any one of other various techniques including, for example, megasonication, ultrasonication (i.e., a lower frequency sonication than megasonication), or other acoustic energy generation mechanisms that generate cavitations. A difference between ultrasonic cleaning and megasonics cleaning lies in the frequency that is used to generate the acoustic waves. Ultrasonic cleaning uses lower frequencies and, thereby, produces more random cavitations. Megasonics cleaning uses higher frequencies (e.g., on the order of several hundred to several thousand kHz in contrast with frequencies on the order of less than several hundred kHz for ultrasonic) and, thereby, produces more controlled cavitations. It should be noted that the megasonic and ultrasonic frequency ranges provided above are only examples and that those of ordinary skill in the art may consider megasonication or ultrasonic to have different frequencies than those noted above. In one exemplary embodiment, a Branson ultrasonic generator may be used for sonication cleaning methods discussed herein.

In one embodiment, the cleaning methods described herein may be utilized for post sputter wet cleaning (PSC) of magnetic recording disks. In an embodiment where the cleaning operations are performed on a magnetic recording disk as part of a PSC module, the magnetic recording disk includes a magnetic recording layer deposited above a substrate. The magnetic layer may be of any known composition, such as a cobalt (Co) alloy. The magnetic layer may be formed on both sides of magnetic recording disk substrate to form a double-sided magnetic recording disk. Alternatively, a single sided magnetic recording disk may be formed. In an alternate embodiment where the cleaning operations are performed as part of a pre-sputter wet cleaning, the magnetic recording disk substrate may be, for example, a glass material, a metal, and/or a metal alloy material. Glass substrates that may be used include, for example, silica containing glass such as borosilicate glass and aluminosilicate glass. Metal and metal alloy substrates that may be used include, for example, aluminum (Al) and aluminum magnesium (AlMg) substrates, respectively. The magnetic recording disk substrate may also be plated with a nickel phosphorous (NiP) layer. Alternatively, the cleaning methods described herein may be used in other pre or post fabrication operation cleans of partially or fully fabricated magnetic recording disks.

FIG. 1A illustrates a cleaning system that may utilize one or more cleaning tanks, according to embodiments of the present invention, in which both sonication cleaning and rinse cleaning of disks are performed in a same cleaning tank. The cleaning system of FIG. 1A includes a first cleaning tank 110 in which both sonication cleaning and rinse cleaning operations are combined. The function of sonication cleaning is to remove a majority of the removable particulates from the disk. The function of rinse cleaning is to further remove loose particulates by oscillating the disks to extract the disks at least partially from submersion in a cleaning liquid within the cleaning tank while keeping the cleaning liquid cleaner than during the sonication. Accordingly, in one embodiment of the present invention, the use of a cross flow of liquid in the cleaning tank is used during rinse cleaning of the disks. Further details of the sonication and rinse cleaning operations are discussed below in relation to FIGS. 2A, 2B and 2C.

Since wet cleaning of disks may also require subsequent drying, the cleaning process of FIG. 1A may also include a dryer tank 130. Although drying operations are not necessarily a part of embodiments of the present invention, such is provided as a context for discussion of the sonication and rinse tanks. A shuttle may be used to hold the disks during the cleaning operations and while the disks are carried to and from the tanks illustrated in FIG. 1A by a disk transport mechanism such as a robot handler. Shuttles and disk transport mechanisms are known to those of ordinary skill in the art; accordingly, further details are illustrated or described herein.

Figure 1B:
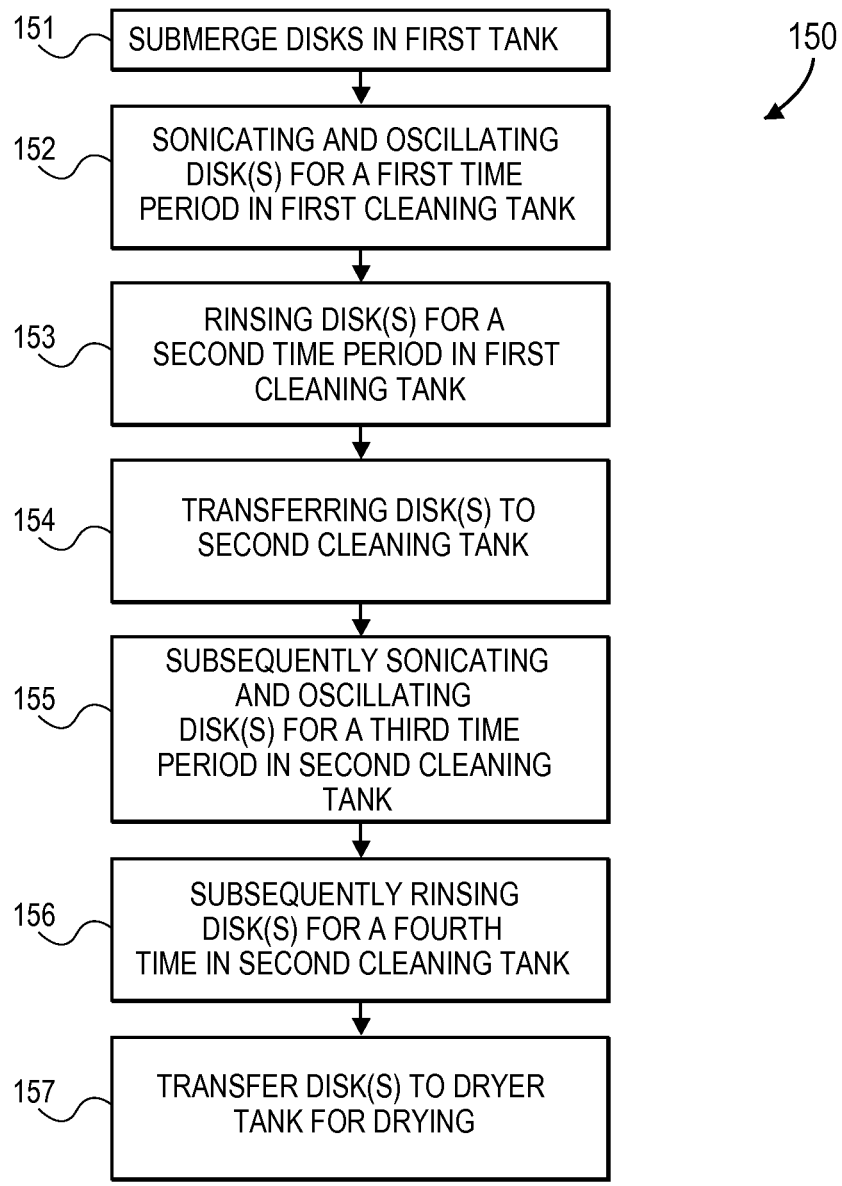
FIG. 1B illustrates one particular embodiment of a cleaning method using a second cleaning tank to perform additional combined sonication cleaning and rinse cleaning operations.

FIG. 1B illustrates one particular embodiment of a cleaning method using a second cleaning tank 120 to perform additional combined sonication cleaning and rinse cleaning operations. The multiple tank cleaning method 150 begins at operation 151 with submerging one or more disks, or disk(s), in first cleaning tank 110. At operation 152, the disk(s) are sonicated, while being oscillated, for a first time period in first cleaning tank 110. Then, the disk(s) are kept in first cleaning tank 110 where a rinse cleaning is performed, operation 153. At operation 154, the disk(s) are transferred to second cleaning tank 120. At operation 155, the disk(s) are subsequently sonicated for a third time period in second cleaning tank 120 followed by operation 156 in which the disk(s) are subsequently rinsed for a fourth time period in the second cleaning tank 120. It should be noted that in the various operations above, the disk(s) may be oscillated for the same time as the sonicating of the disk(s) but need not be. In some embodiments, the disk(s) may be oscillated for lesser or greater time periods than the sonicating of the disk(s). As previously mentioned, further details of the sonicating, oscillating and rinsing operations are discussed below in relation to FIGS. 2A, 2B and 2C. In one embodiment, the disk(s) may then be transferred to the third, drying tank 130, operation 157. Alternatively, the disk(s) may be transferred to additional sonication and/or rinsing tanks, or other types of cleaning tanks before drying.

In the multiple tank cleaning method 150 of FIG. 1B, the time periods during which sonication and rinsing are performed in each of tanks 110 and 120 may be different. For example, a first time period of sonication of the disks in the first tank 110 may be less than the a third time period of subsequent sonication in second tank 120, and a second time period of rinsing of the disks in the first tank 110 may be more than a fourth time period of subsequent rinsing in second tank 120. With such a configuration, the cleaning liquid in the second tank is maintained cleaner than the cleaning liquid in the first tank because the disks have fewer contaminant particles after some initial sonication and rinsing in the first tank 110. By performing a portion of sonication operation in a second cleaner tank 120, the disk(s) may be subjected to less re-deposition of particles than if the entire sonication cleaning process had been performed entirely in a single tank 110 and, thereby, produce cleaner disks. The cleaning liquid may be composed of any one of various liquids such as de-ionized water, a solvent, a soap solution, etc.

In one embodiment, a ratio of the first time period to the second time period may be in a range from 2:1 to 6:1 and a ratio of the third time period to the fourth time period may be in a range from 3:1 to 10:1. The first time period may in a range of 40 to 60 seconds, the second time period may be in a range of 10 to 20 seconds, the third time period may be in a range of 45 to 75 seconds, and the fourth time period may be in a range of 7.5 to 15 seconds.

It should be noted that the sonication in tanks 110 and 120 may be performed at different cavitations frequencies, for example, the first sonication in tank 110 may be performed at a lower cavitations frequency than the subsequent sonication that is performed in tank 120. In one particular embodiment, the first sonication may be performed at a cavitations frequency in a range of 120 to 470 kHz and the subsequent sonication may be performed at a cavitations frequency in a range of 170 to 950 kHz. It should be noted that time periods, ratios, and frequencies provide above are only exemplary and may have other values in alternative embodiments.

FIGS. 2A and 2B illustrate the sonication and rinse operations that are performed in a common cleaning tank, according to one embodiment of the present invention. It should be emphasized the FIGS. 2A and 2B illustrate two different cleaning operations that are performed in the same tank 215. Tank 215 may represent either one or both of tanks 110 and 120 of FIG. 1A. In addition, certain mechanical components such as the shuttle and the handler that hold and oscillate the disk(s) are not illustrated in FIGS. 2A-2C so as not to obscure an illustration of the described methods but, rather, are illustrated in the cleaning system of FIG. 3.

FIG. 2A illustrates sonication cleaning operations in tank 215 according to one embodiment of the present invention. Initially, the disk(s) 201 are lowered by a shuttle into tank 215 such that the disk(s) 201 are submerged in cleaning liquid 235. A cross flow of the cleaning liquid is established in the tank 215 in order to remove cleaning liquid particles from a vicinity of the disk(s) 201. Tank 215 is equipped with sonication plate transducers 250 that can be activated, or powered on, under the control of a programmable controller, to generate an acoustic stream 251 emanating from the bottom of tank 215 towards the disk(s) in direction 252. The disk(s) 201 are also oscillated 260 during sonication, in a parallel direction to the direction 252 of the acoustic stream 251, to generate agitation cleaning of the disk(s) 201. The oscillation of the disk(s) 201 may be performed by a handler such as the one used to transport the disk(s) 201 into tank 215 or by other mechanisms (e.g., manually). The disk(s) may be oscillated at a velocity, for example, in a range of 1,000 millimeters per minute (mm/min) to 10,000 mm/min. Sonication equipment such as the plate transducers and controllers is known in the art; accordingly, a more detailed discussion is not provided.

In the sonication cleaning operation illustrated in FIG. 2A, the power settings for the sonication plate transducers 250 may be different when the disk(s) 201 are at the upper oscillation position 268 than when the disk(s) are at the lower oscillation position 267. In one embodiment, the sonication power at the lower oscillation position 267 may be in a range of 200 to 800 watts, and the sonication power at the upper oscillation position 268 may be in range of 400 to 800 watts. Alternatively, other power settings may be used at the upper and lower oscillation positions.

After the disk(s) 201 are sonicated for a first time period of a desired time, the disk(s) 201 remain in tank 215 for rinsing, as illustrated in FIG. 2B. During rinsing, a cross flow 241 of the cleaning liquid 235 is generated in the tank 215 while the disk(s) are further oscillated 261 in a manner that removes at least a portion of the disk(s) 201 from submersion in the cleaning liquid 235. The cross flow 241 of cleaning liquid 235 is perpendicular to the direction of oscillating 261. The cross flow 241 during the rinse cleaning of FIG. 2B may be set to have the same velocity as the cross flow 240 during the sonication cleaning of FIG. 2A or may be set to lower velocity to reduce dispersal of particulates in the cleaning solution. As an example, the cross flows 240 and 241 of the cleaning liquid 235 in either cleaning modes may have a velocity in a range of 5 to 30 millimeters per second.

Before initiating further oscillation 261 during the rinse cleaning mode, the disk(s) may be positioned at a reference position 271 such that they are completely submerged in the cleaning liquid 235. During further oscillation 261, the disk(s) 201 may be moved to an upper oscillation, or offset, position 272. In one embodiment, the offset position 272 may be set such that the disk(s) 201 are completely removed from submersion in the cleaning liquid 235 as illustrated in FIG. 2B. Alternatively, the offset position 272 may be set such that the disk(s) 201 are only partially removed from submersion in the cleaning liquid 235. Using such an offset method may prevent the need for changing the cleaning system's default reference or starting points (which may also be referred to as a teach point). In one embodiment, the initial reference position 271 may correspond with the lowest position at which the disk(s) are oscillated 260 during the sonication illustrated in FIG. 2A. However, alternatively, the reference position 271 may be set to a different position.

When tank 215 is switched from a sonication mode to a rinse mode of operation (e.g., by PLC 395 of FIG. 3), a higher, upper oscillation position may be set for the disk(s) 201 to the desired offset position 272 for rinsing to enable the disk(s) to be lifted at least partially above the surface of the cleaning liquid 235. The difference 273 between the offset position 272 and the reference position 271 may be in a range of 80 to 100 millimeters. Alternatively, other difference distances may be used. It should also be noted that the disk(s) 201 may be oscillated at either the same or a different velocity when moved toward the offset position 272 than when moved toward to the reference position 271. In one embodiment, for example, the disk(s) 201 are oscillated at a slower velocity when moved toward the reference position 271 than when moved toward the offset position 272.

Moreover, the disk(s) 201 may be oscillated during rinsing at the same velocity of oscillation as during sonication. In one embodiment, the further oscillation of the disk(s) 201 during the rinsing of FIG. 2B may be at a lower velocity than during the sonication of FIG. 2A, for example, at a velocity in a range of 1,000 to 3,000 millimeters per minute (mm/min). Alternatively, the disk(s) may be further oscillated during rinsing at the same or greater velocity of oscillation than during sonication cleaning of FIG. 2A.

In the rinsing embodiment illustrated in FIG. 2B, the sonication plate transducers 250 are maintained powered on to continue the acoustic stream 251 either at a same power setting as used during the sonication cleaning of FIG. 2A or at a reduced power via a programmable controller. Furthermore, the power settings may be different when the disk(s) 201 are at the upper and lower oscillation positions. In one embodiment, the sonication power at the reference position 271 may be in a range of 100 to 600 watts and, the sonication power at the offset position 272 may be in range of 0 to 300 watts. Alternatively, other power settings may be used. In another embodiment, power to the sonication plate transducers 250 may be turned off during the rinse cleaning of disk(s) such that no acoustic stream is generated 259 as illustrated in FIG. 2C

Figure 3:
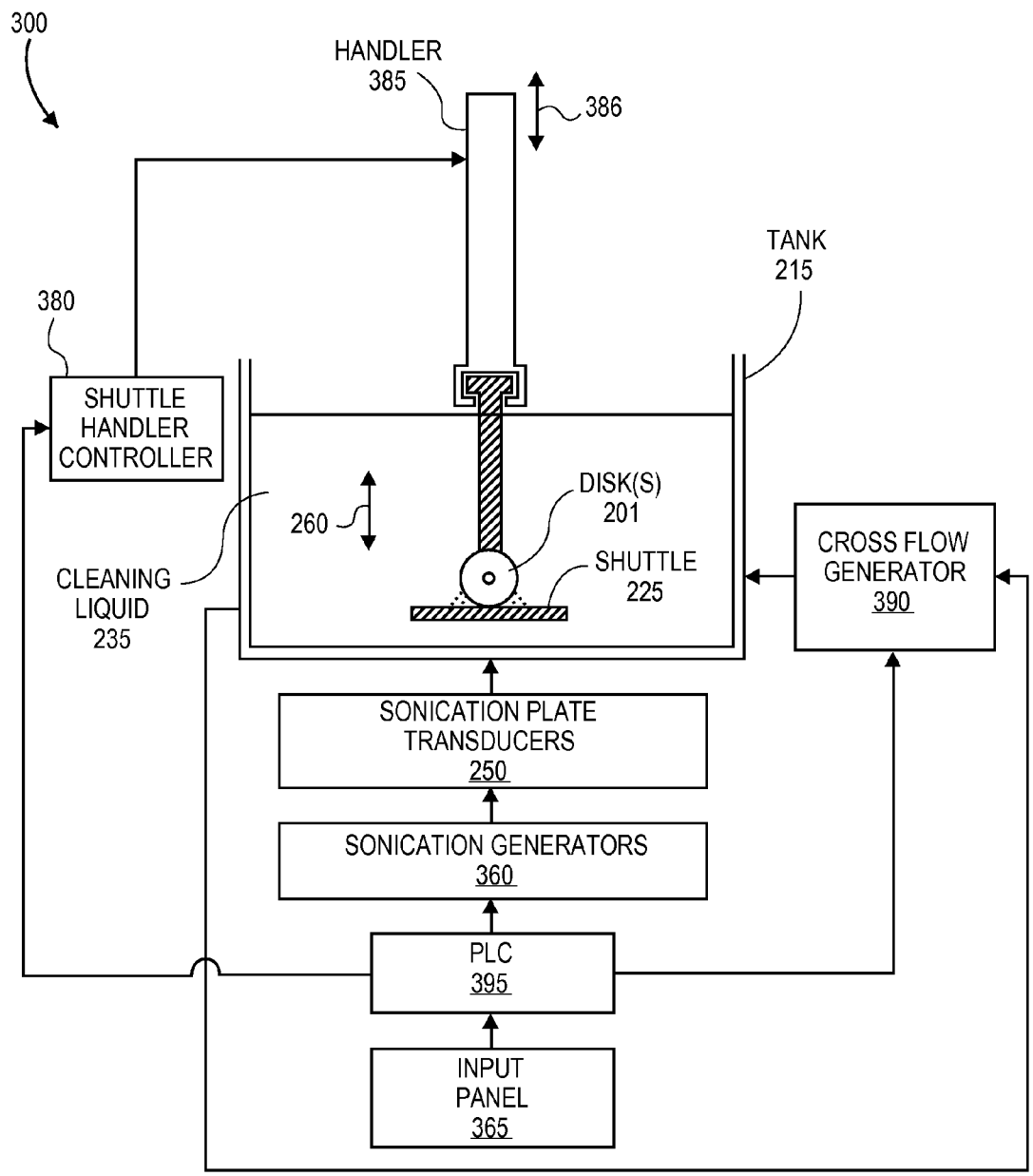
FIG. 3 is a block diagram illustrating a cleaning control system according to one embodiment of the present invention.

FIG. 3 is a block diagram illustrating a cleaning control system 300 according to one embodiment of the present invention. As depicted, a system controller, such as programmable logic controller (PLC) 395 is used to control the operation of the various subsystem controllers, generators, and components. The PLC 395 is coupled to sonication generator 360 to control the operation (e.g., power settings and frequencies) of sonication plate transducers 250 through a user input panel 365. A user may program the PLC 395, through input panel 365, with different power settings at different stages of the cleaning operations discussed above. The sonication plate transducers 250, under control of PLC 395, generate an acoustic stream in the cleaning liquid 235 of tank 215. It should be noted that the same PLC 395 may be coupled to the sonication generators or the sonication plate transducers of both the first cleaning tank 110 and second cleaning tank 120 of FIG. 1A. Alternatively, each of the first and second cleaning tanks may have their own respective sonication generators or PLCs.

The cleaning control system 300 also includes a shuttle handler controller 380 coupled to handler 385 which, in turn, is coupled to disk(s) 201 carrying shuttle 225. The shuttle handler controller 380 controls the submersion and removal 386 of disk(s) into tank 215 and the transfer of the shuttle 225 between tanks (e.g., tanks 110 and 120). The shuttle handler controller 380 also controls the oscillation 260 of the disk(s) 201 on shuttle 225 during either sonication or rinse cleaning operations. A user may program the PLC 395, through input panel 365, to control the oscillation and dwell of the shuttle handler controller 380 in coordination with the power settings and frequencies for the sonication generators 360. The cleaning control system 300 also includes a cross flow generator 390 to generate a cross flow of cleaning liquid 235 within tank 215 as discussed above. The cross flow generator 390 includes components to generate cross the cross flows of cleaning liquid described above, for example, a pump to drive the cross flows of cleaning liquid, a valve to control the flow rates, and perforated side panels on tank 215 designed to control the desired laminar cross flow.

Shuttle handler controllers, cross flow generators, PLCs, sonication generators and sonication plate transducers are known to those of ordinary skill in the art; accordingly, further details are not provided herein. The various components for the cleaning systems are commercially available, for example, the PLC may be obtained from Controls Technology (CTC) or Mitsubishi; the sonication plate transducers and generator may be obtained from Branson or Crest; the shuttle handler and controller may be obtained from Star Linear System; and the cross flow generator and tank may be obtained from SpeedFam Corp.

Although these embodiments have been described in language specific to structural features and methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. A method, comprising:
submerging one or more workpieces in a rinse tank containing a cleaning liquid;
oscillating the one or more workpieces to remove at least a portion of the one or more workpieces from submersion in the cleaning liquid while generating a cross flow of the cleaning liquid in the rinse tank to generate tunnel flow shear cleaning of the one or more workpieces without sonicating the one or more workpieces.

2. The method of claim 1, wherein the cross flow of the liquid is perpendicular to a direction of oscillating.

3. The method of claim 1, wherein the cleaning liquid is flowed in planes parallel to the surfaces of the one or more workpieces.

4. The method of claim 1, wherein the cleaning liquid comprises de-ionized water.

5. The method of claim 1, wherein the cleaning liquid comprises a solvent.

6. The method of claim 1, wherein the cross flow has a rate in an approximate range of 5 to 30 millimeters per second.

7. The method of claim 1, wherein the one or more workpieces are oscillated at a rate in a range of 1,000 millimeters per minute (mm/min) to 10,000 mm/min.

8. The method of claim 1, further comprising sonicating the one or more workpieces within the rinse tank.

9. The method of claim 1, wherein the one or more workpieces are at least partially fabricated magnetic recording disks.

* * * * *